US012633768B2

(12) United States Patent
Kendzia, III et al.

(10) Patent No.: US 12,633,768 B2
(45) Date of Patent: May 19, 2026

(54) STATIC TRANSFER SWITCHES WITH INTELLIGENT BYPASS

(71) Applicant: ABB Schweiz AG, Baden (CH)

(72) Inventors: Thomas Anthony Kendzia, III, Rockville, VA (US); Veerakumar Bose, Henrico, VA (US); Christopher Alan Belcastro, Henrico, VA (US)

(73) Assignee: ABB Schweiz AG, Baden (CH)

( * ) Notice: Subject to any disclaimer, the term of this patent is extended or adjusted under 35 U.S.C. 154(b) by 27 days.

(21) Appl. No.: 18/463,869

(22) Filed: Sep. 8, 2023

(65) Prior Publication Data

US 2025/0088029 A1 Mar. 13, 2025

(51) Int. Cl.
*H02J 9/06* (2006.01)
(52) U.S. Cl.
CPC .................................... *H02J 9/061* (2013.01)
(58) Field of Classification Search
CPC ....................................................... H02J 9/061
USPC ........................................................... 307/64
See application file for complete search history.

(56) References Cited

U.S. PATENT DOCUMENTS 7,265,458 B2 9/2007 Edelen et al.
11,489,333 B2 11/2022 Song et al.

2004/0070278 A1* 4/2004 Divan .................... H02J 3/0073
307/64
2016/0197483 A1 7/2016 Steinert et al.
2021/0028621 A1 1/2021 Oudrhiri et al.
2021/0249896 A1* 8/2021 Panfil ........................ H02J 3/46

FOREIGN PATENT DOCUMENTS

CN 115800490 A 3/2023

OTHER PUBLICATIONS

Extended European Search Report for Application No. 24198710.6, dated Feb. 11, 2025, 7 pages.

* cited by examiner

*Primary Examiner* — Michael R. Fin
(74) *Attorney, Agent, or Firm* — McCarter & English, LLP; Michael M. Gnibus

(57) ABSTRACT

A static transfer switch includes first and second inputs, an output, first and second bypass breakers, first and second power stages, first and second contactors, a load switch, and a controller. The first and second inputs are configured to selectively couple with a first power source via a first circuit breaker and a second power source via a second circuit breaker, respectively. The first and second bypass breakers are configured to selectively couple the first and second input with the output, respectively. The first and second contactors are configured to selectively couple the first input with the first power stage and the second input with the second power stage, respectively. The load switch is configured to selectively couple the first and second power stages with the output, and the controller is configured to modify an operating state of the first and second contactors and the first and second power stages.

20 Claims, 8 Drawing Sheets

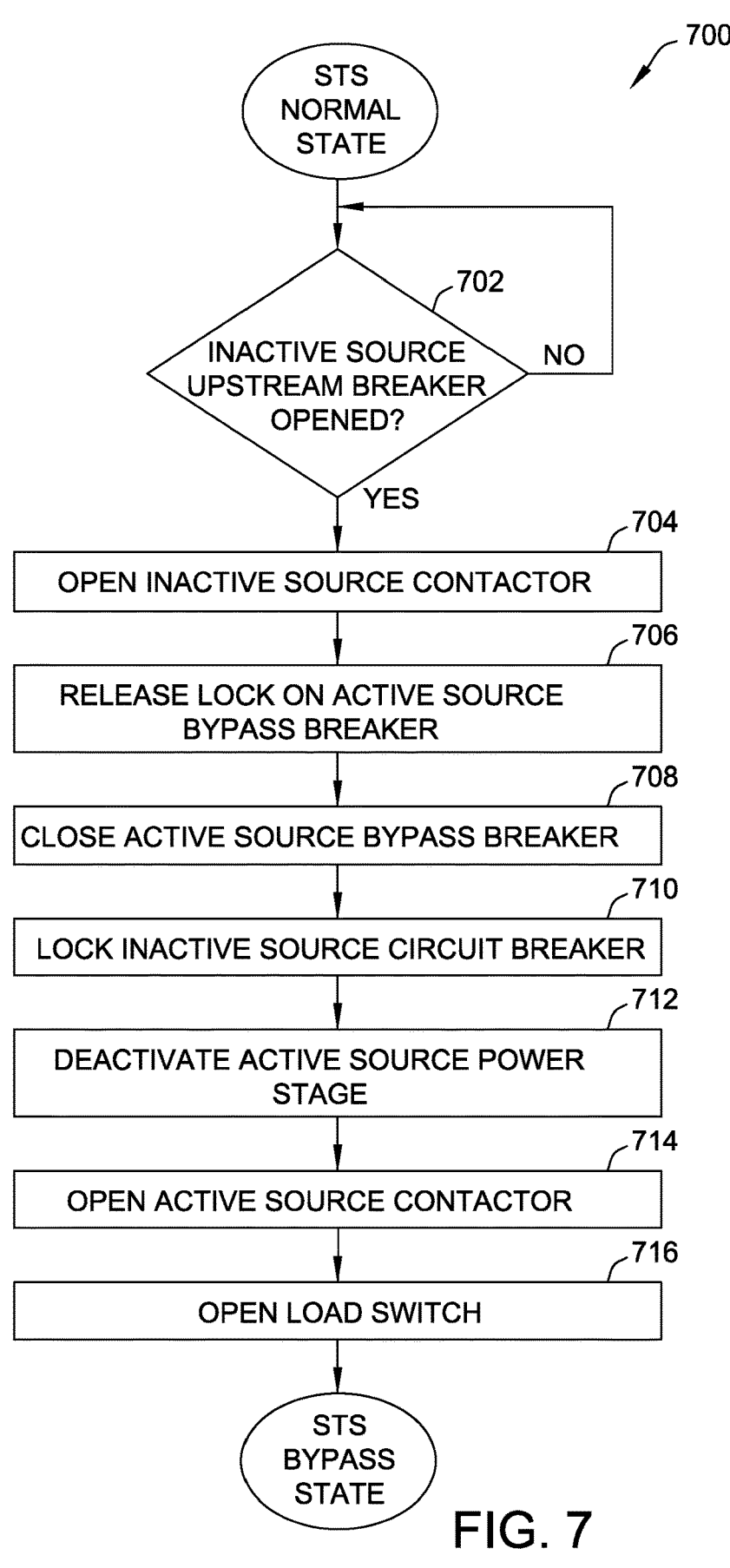

700

```
        ┌──────────┐
        │   STS    │
        │  NORMAL  │
        │  STATE   │
        └──────────┘
             │
             │         ┌──────────┐
             ▼         │          │
          ╱◇◇◇◇╲       │
        ╱  702  ╲      │
      ╱ INACTIVE  ╲  NO │
     ◇ SOURCE       ◇──┘
      ╲ UPSTREAM   ╱
        ╲ BREAKER ╱
          ╲OPENED?╱
             │ YES
             ▼
```

704
OPEN INACTIVE SOURCE CONTACTOR

706
RELEASE LOCK ON ACTIVE SOURCE
BYPASS BREAKER

708
CLOSE ACTIVE SOURCE BYPASS BREAKER

710
LOCK INACTIVE SOURCE CIRCUIT BREAKER

712
DEACTIVATE ACTIVE SOURCE POWER
STAGE

714
OPEN ACTIVE SOURCE CONTACTOR

716
OPEN LOAD SWITCH

STS
BYPASS
STATE

FIG. 7

STATIC TRANSFER SWITCHES WITH INTELLIGENT BYPASS

BACKGROUND

The field of the disclosure relates to static transfer switches, and in particular, to static transfer switches that utilize control systems that coordinate bypass activities for the static transfer switches.

A static transfer switch (STS) is a device that is designed to transfer from supplying a load via a preferred power source to supplying the load via an alternate power source when the power quality of the preferred power source is deemed unacceptable for the load. STS power stages use thyristors or other types of solid-state devices as the main switching device, which do not provide galvanic isolation to service personnel during servicing operations at the STS. Conventional STSs therefore have used manually operated switches or circuit breakers to bypass the STS power stages.

Problems arise, however, when operator error during bypass and un-bypass operations result in a power loss at a critical load supplied by the STS. Further, typical STSs may require complicated electrical or mechanical key interlocking schemes that to prevent powering the load across multiple sources (e.g., when more than one bypass breaker is closed at the same time) when transitioning the STS into and out of bypass. Further still a significant amount of area may be needed in the STS to access and operate the mechanical key interlocking schemes and the additional breakers and/or circuits used to implement bypass operations on a typical STS.

Thus, it is desirable to improve the operation and performance of STSs for implementing bypass functionality in STSs.

BRIEF DESCRIPTION

In one aspect, a static transfer switch is provided. The static transfer switch includes first and second inputs, an output configured to couple with a load, first and second bypass breakers, first and second power stages, first and second contactors, a load switch, and a controller. The first input is configured to selectively couple with a first power source via a first circuit breaker, and the second input is configured to selectively couple with a second power source via a second circuit breaker. The first bypass breaker is configured to selectively couple the first input with the output, and the second bypass breaker is configured to selectively couple the second input with the output. The first and second power stages are configured to conduct electrical power when active. The first contactor is configured to selectively couple the first input with the first power stage, and the second contactor is configured to selectively couple the second input with the second power stage. The load switch is configured to selectively couple the first and second power stages with the output, and the controller is configured to modify an operating state of the first and second contactors and the first and second power stages.

In another aspect, a static transfer switch is provided. The static transfer switch includes first and second inputs, an output configured to couple with a load, first and second bypass breakers, first and second power stages, first and second contactors, a load switch, and a controller. The first input is configured to selectively couple with a first power source via a first circuit breaker, and the second input is configured to selectively couple with a second power source via a second circuit breaker. The first bypass breaker is configured to selectively couple the first input with the output, and the second bypass breaker is configured to selectively couple the second input with the output. The first and second power stages are configured to conduct electrical power when active. The first contactor is configured to selectively couple the first input with the first power stage, and the second contactor is configured to selectively couple the second input with the second power stage. The load switch is configured to selectively couple the first and second power stages with the output, and the controller is configured, in response to the first and second circuit breakers being close, the first and second bypass breakers being open, the first power stage being active, the second power stage being inactive, the first and second contactors being closed, and the load switch being closed, to determine whether the second circuit breaker has opened, and in response to determining that the second circuit breaker has opened, to open the second contactor, release a lock on the first bypass breaker, close the first bypass breaker, lock the second circuit breaker in an open position, deactivate the first power stage, open the first contactor, and open the load switch.

DRAWINGS

These and other features, aspects, and advantages of the present disclosure will become better understood when the following detailed description is read with reference to the accompanying drawings in which like characters represent like parts throughout the drawings.

FIG. 7 is a flow chart of a method for transitioning a static transfer switch from a normal state to a bypassed state in an exemplary embodiment.

Figure 1:
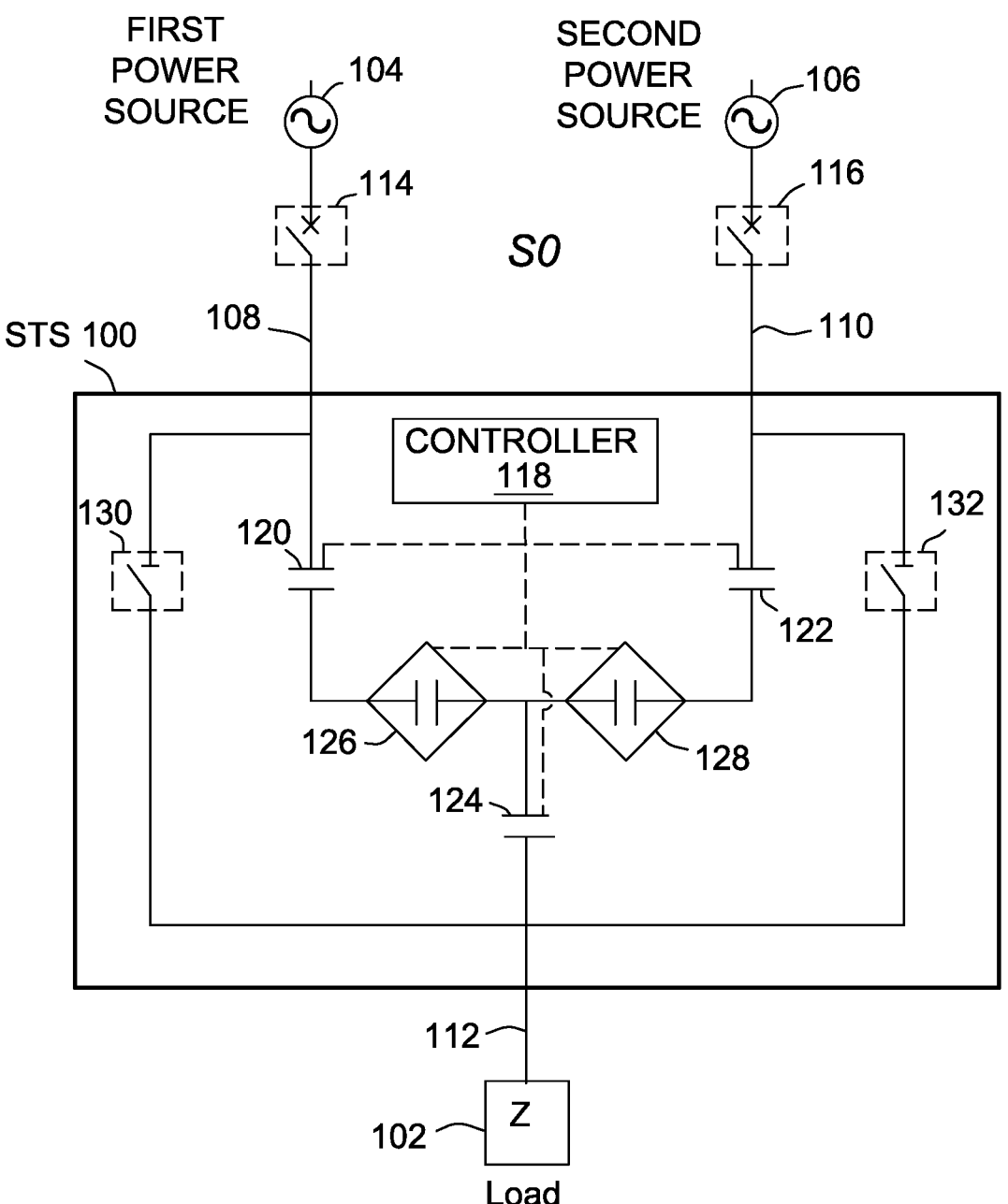
FIG. 1 depicts a simplified circuit diagram of a static transfer switch in an operating state S0 in an exemplary embodiment.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

As discussed previously, in order to implement bypass operations on a typical STS, complicated mechanical key interlocks may be needed in order to ensure that the load is not dual sourced at the same time by the bypass breakers. In addition, the additional mechanical key interlocks typically used on an STS for bypass operations may entail additional operator interaction and the potential for inadvertently disconnecting a critical load from a source.

In the embodiments described herein, STSs are disclosed that utilize hybrid bypass schemes that include both manual breakers and contactors operated by a controller. The use of hybrid bypass schemes eliminate or reduce prior operator error during bypassing and un-bypassing an STS. The hybrid bypass schemes enable simple interlocking between bypass switches, reduces the operator effort when transitioning the STS into and out of bypass, and reduces the mechanical complexity of STSs.

FIG. 1 depicts a simplified circuit diagram of an STS 100 in an operating state S0 in an exemplary embodiment. In this embodiment, STS 100 selectively supplies a load 102 with electrical power from either a first power source 104 or a second power source 106 depending on various criteria. For example, STS 100 may supply electrical power to load 102 primarily from first power source 104 unless the electrical power delivered by first power source 104 falls outside of a desired range of values (e.g., first power source 104 has a voltage and/or a harmonic distortion that varies from target values by a threshold amount). If, for example, first power source 104 is incapable of supplying electrical power to load 102 (e.g., first power source 104 fails or is incapable of supplying electrical power to load 102 at a desired power quality), then STS 100 switches load 102 from first power source 104 to second power source 106. In this regard, first power source 104 may operate as a preferred power source for load 102, with second power source 106 operating as a backup or alternate power source for load 102. Although only two power sources for load 102 are depicted in FIG. 1, STS 100 selectively couples load 102 to any number of power sources in other embodiments. Further, although STS 100 is depicted as switching single phase Alternating Current (AC) power in FIG. 1, STS 100 switches 3-phase AC power in other embodiments. In 3-phase AC embodiments, first power source 104 and second power source 106 are 3-phase AC sources, and load 102 is a 3-phase AC load. In other embodiments, first power source 104 and second power source 106 are Direct Current (DC) sources, and load 102 is a DC load. In other embodiments, first power source 104 and second power source 106 are 3-phase AC sources, and STS 100 supplies a plurality of single-phase AC loads (e.g., load 102 is a plurality of single-phase AC loads).

In this embodiment, first power source 104 is electrically coupled to STS 100 at a first input 108 and second power source 106 is electrically coupled to STS 100 at a second input 110. Load 102 is electrically coupled to an output 112 of STS 100. First input 108 is selectively coupled with first power source 104 via a first circuit breaker 114 and second input 110 is selectively coupled with second power source 106 via a second circuit breaker 116. First circuit breaker 114 and second circuit breaker 116 may comprise manual breakers (which open and close via operator interaction), electro-mechanically operated breakers (which open and close via external command signals from a controller 118), and combinations thereof.

In this embodiment, STS 100 further includes a first contactor 120, a second contactor 122, a load switch 124, a first power stage 126, a second power stage 128, and controller 118. Generally, first and second contactors 120, 122 comprise any component, system, or device that provides galvanic isolation between their respective first and second inputs 108, 110 and first and second power stages 126, 128 (e.g., first and second contactors 120, 122 may comprise an electro-mechanical device that provides galvanic isolation via an air gap when opened). First and second contactors 120, 122 may be opened and closed via commands or signals provided by controller 118. Further, first and second contactors 120, 122 may not be externally accessible at STS 100 by an operator in some embodiments, and further still, first and second contactors 120, 122 may not provide overcurrent trip capabilities in some embodiments.

First and second power stages 126, 128 may comprise thyristors or other types of solid-state switches, which selectively couple first and second contactors 120, 122 with load switch 124, respectively. Load switch 124 may comprise any component, system, or device that provides galvanic isolation between first and second power stages 126, 128 and output 112 of STS 100 (e.g., load switch 124 may comprise an electro-mechanical device that provide galvanic isolation via an air gap when opened such as a breaker or a contactor). Load switch 124 may be opened and closed via commands or signals provided by controller 118. In some embodiments, load switch 124 may comprise a breaker accessible to an operator at STS 100. Further, load switch 124 may provide overcurrent tip capabilities in some embodiments. In other embodiments, load switch 124 comprises one or more solid-state switching devices, such as thyristors.

In this embodiment, STS 100 further includes a first bypass breaker 130 and a second bypass breaker 132, which may be manually operated by an operator and/or electromechanically operated by controller 118. In some embodiments, first bypass breaker 130 and/or second bypass breaker 132 comprise switches (e.g., molded case switches). In this embodiment, first and second bypass breakers 130, 132 include an interlock (mechanical, electrical, or combinations thereof) which prevents both first and second bypass breakers 130, 132 from being closed at the same time. In some embodiments, controller 118 operates first and second bypass breakers 130, 132 to implement the interlock between first and second bypass breakers 130, 132. For example, controller 118 prevents second bypass breaker 132 from being closed by an operator if controller 118 detects that first bypass breaker 130 is already closed, and vice versa. In other embodiments, controller 118 may implement electromagnetic locks at first and second bypass breakers 130, 132 in order to prevent first and second bypass breakers 130, 132 from being opened or closed at the wrong time as STS 100 transitions between a normal operating state and a bypassed operating state, and vice versa.

In operating state S0, first and second circuit breakers 114, 116, first and second contactors 120, 122, load switch 124, and first and second bypass breakers 130 132 are open. Further, first and second power stages 126, 128 are deactivated or inactive. Operating state S0 may occur at startup of STS 100, when neither first and second power sources 104, 106 are powering load 102.

Figure 2:
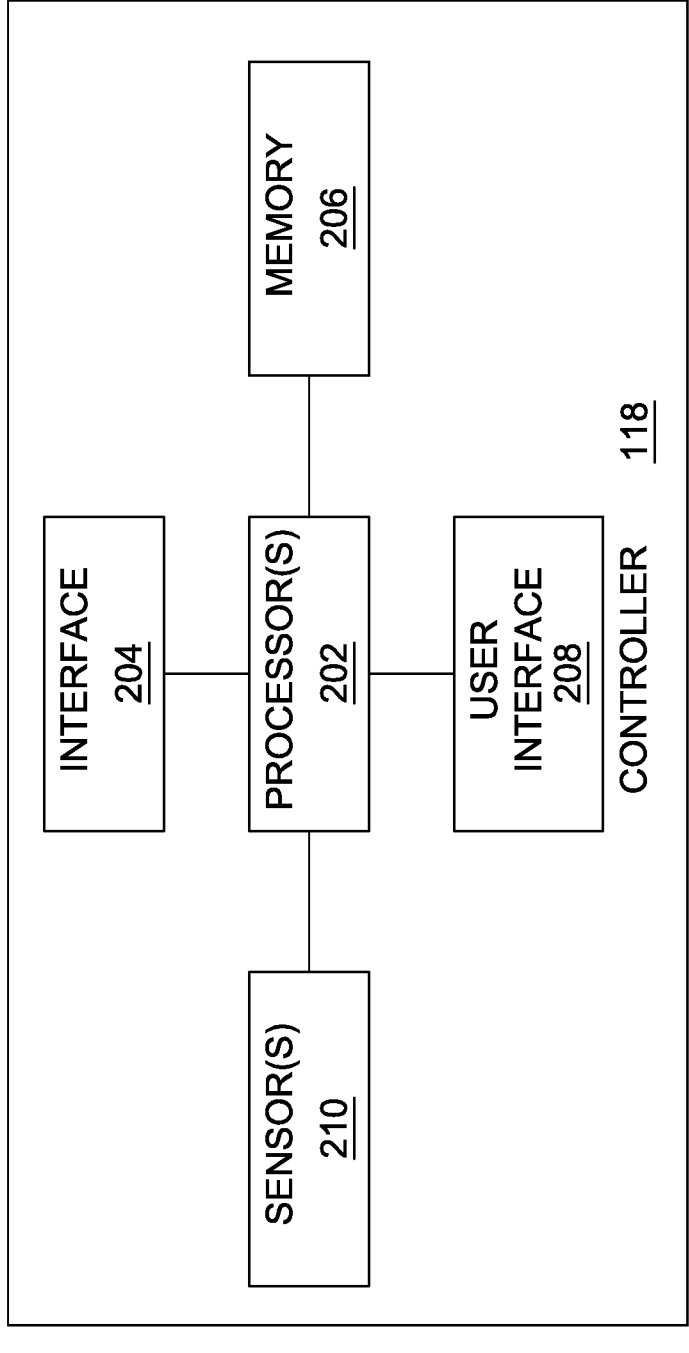
FIG. 2 depicts a block diagram of a controller of the static transfer switch of FIG. 1 in an exemplary embodiment.

FIG. 2 depicts a block diagram of controller 118 in an exemplary embodiment. Controller 118 comprises any component, system, or device that performs the functionality described herein for controller 118. Controller 118 will be described with respect to various discrete elements, which perform functions. These elements may be combined in different embodiments or segmented into different discrete elements in other embodiments. In this embodiment, controller 118 comprises at least one processor 202, at least one interface 204, at least one memory 206, a user interface 208. and at least one sensor 210. In some embodiments, memory 206 stores programmable instructions that control the operation of processor 202 in order to implement the functionality described herein for controller 118. In some embodiments, controller 118 comprises a different configuration of components, and therefore, the discussion of controller 118 is not limited to the specific configuration and arrangement depicted in FIG. 2.

Interface 204 may comprise wired interfaces, wireless interfaces, and combinations thereof. Interface 204 may be used by controller 118 to communicate with the various components of FIG. 1, such as first and second circuit breakers 114, 116, first and second bypass breakers 130, 132, first and second contactors 120, 122, first and second power stages 126, 128, and load switch 124, in order to control to control their operation and/or in order to determine their open and closed states. User interface 208 may comprise keypads, display devices, trackball devices, mice, buttons, and the like, which enable an operator to interact with STS 100. Sensors 210 comprise any voltage sensor, current sensor, frequency sensor, and combinations thereof. Sensors 210 may be used by controller 118 to determine the operating states (e.g., open or closed) of the various switching components of FIG. 1, such as first and second circuit breakers 114, 116, first and second bypass breakers 130, 132, first and second contactors 120, 122, first and second power stages 126, 128, and load switch 124. Sensors 210 may also be used to evaluate the operation and/or the power quality at first and second power sources 104, 106, measure various electrical parameters at first and second inputs 108, 110, output 112, etc.

Figure 3:
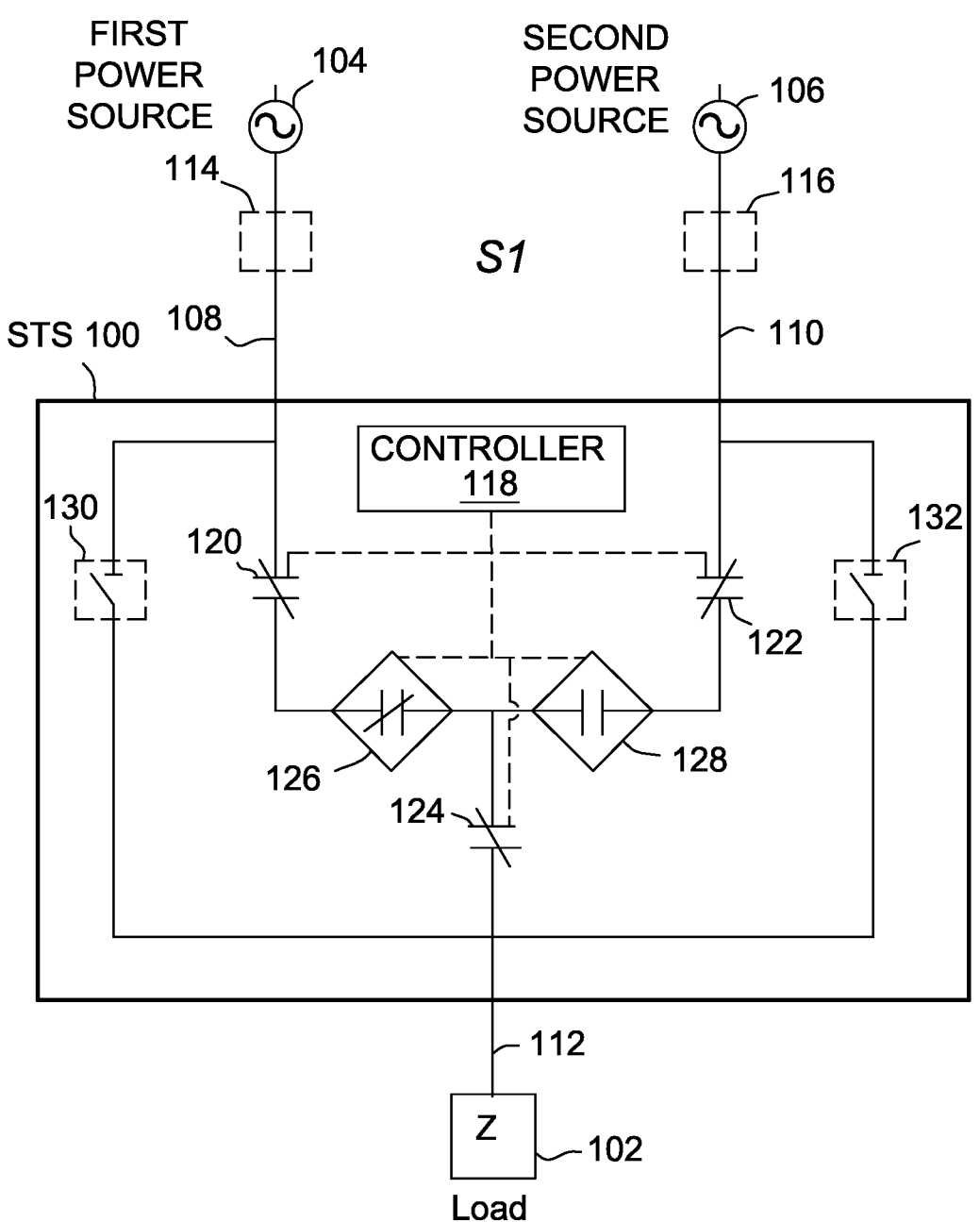
FIG. 3 depicts a simplified circuit diagram of the static transfer switch of FIG. 1 in an operating state S1 in an exemplary embodiment.

FIG. 3 depicts a simplified circuit diagram of STS 100 in an operating state S1 in an exemplary embodiment. In operating state S1, first power source 104 is the power source for load 102 and second power source 106 is the backup or alternate power source for load 102. First and second circuit breakers 114, 116 are closed, first and second contactors 120, 122 are closed, and load switch 124 is closed. First power stage 126 is active (e.g., first power stage 126 conducts current) and second power stage 128 is inactive (e.g., second power stage 128 does not conduct current). First and second bypass breakers 130, 132 are open. Operating state S1 may be considered a normal operating state for STS 100 when first power source 104 is powering load 102 via first contactor 120, first power stage 126, and load switch 124.

Figure 5:
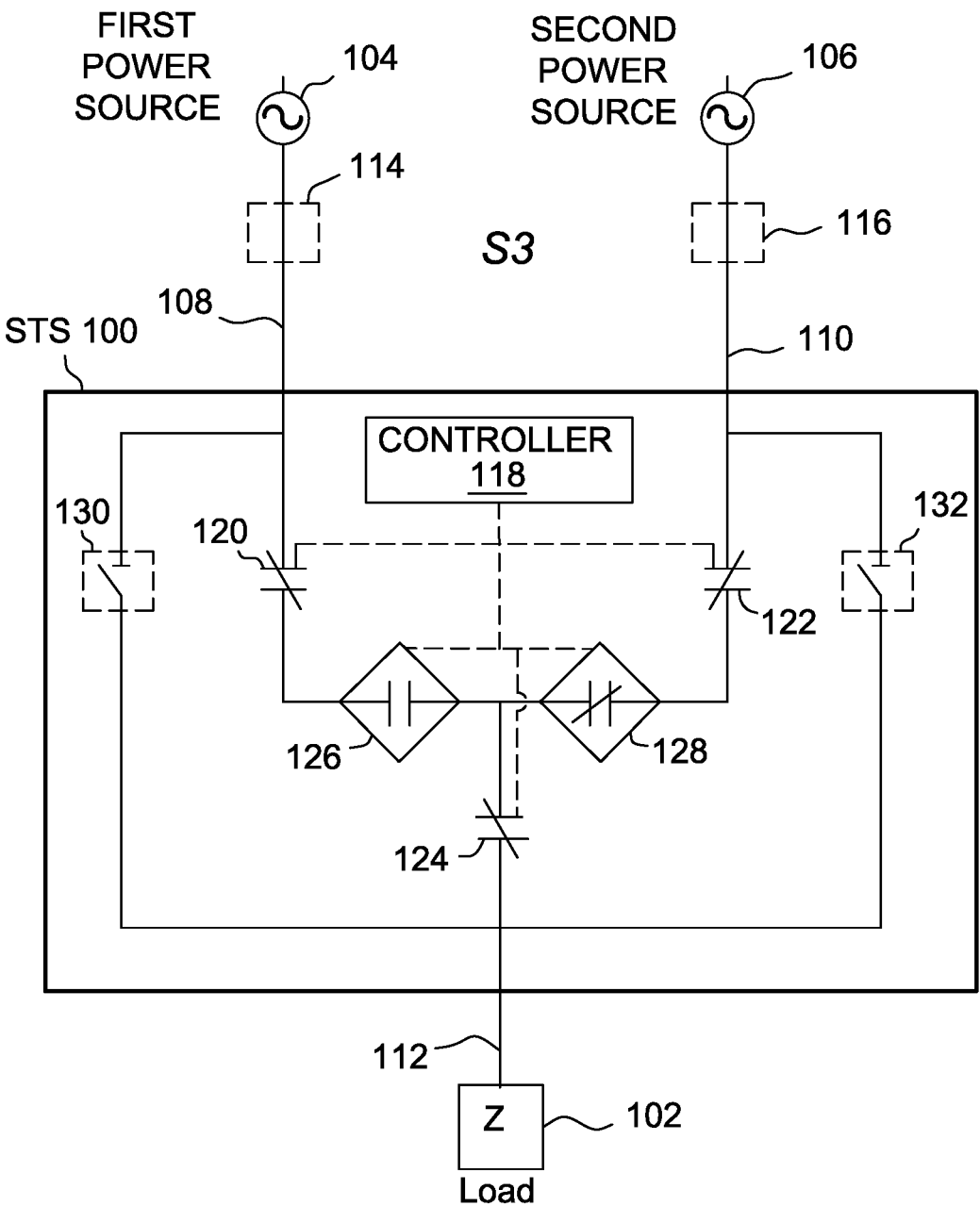
FIG. 5 depicts a simplified circuit diagram of the static transfer switch of FIG. 1 in an operating state S3 in an exemplary embodiment.

In operating state S1, if controller 118 determines that first power source 104 is not capable of supplying electrical power to load 102 (e.g., due to power loss at first power source 104 or a power quality issue at first power source 104), then controller 118 operates to quickly transfer load 102 from first power source 104 to second power source 106 by activating second power stage 128 and deactivating first power stage 126 (e.g., using a load transfer process). The result of this load transfer process is depicted in FIG. 5, which illustrates an operating state S3 of STS 100 when second power source 106 is powering load 102 and first power source 104 is the backup power source for load 102. In operating state S3, first power stage 126 is inactive, and second power stage 128 is active. Operating state S3 may be considered a normal operating state for STS 100 when second power source 106 is powering load 102 via second contactor 122, second power stage 126, and load switch 124.

Figure 4:
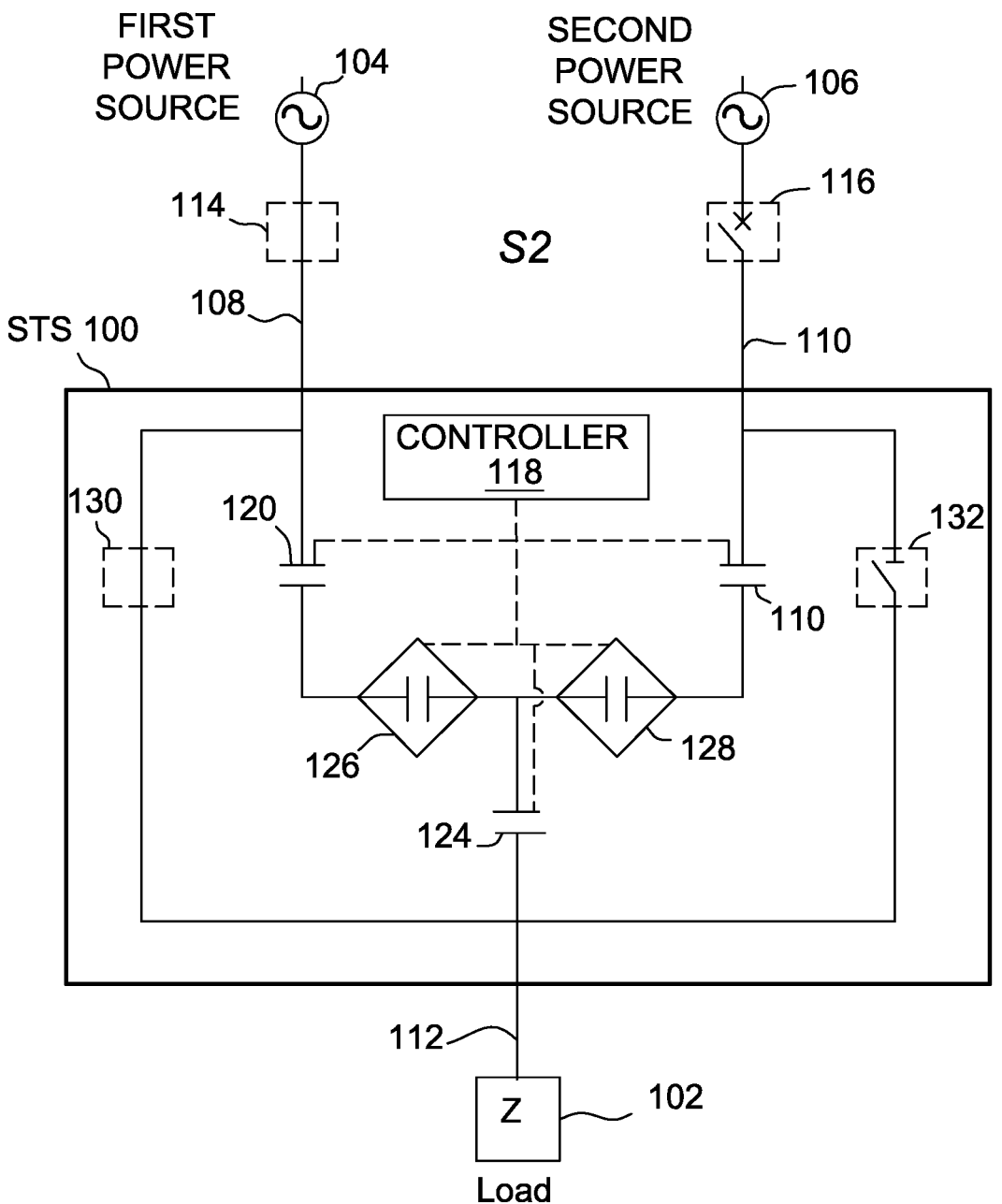
FIG. 4 depicts a simplified circuit diagram of the static transfer switch of FIG. 1 in an operating state S2 in an exemplary embodiment.

FIG. 4 depicts a simplified circuit diagram of STS 100 at an operating state S2 in an exemplary embodiment. In operating state S2, STS 100 is in bypass while first power source 104 continues to power load 102. In operating state S2, first power source 104 is the power source for load 102 and second power source 106 is disconnected from second input 110 of STS 100. First circuit breaker 114 is closed and second circuit breaker 116 open. First and second contactors 120, 122 are open, and load switch 124 is open. First and second power stages 126, 128 are inactive (e.g., first and second power stages 128 do not conduct current). First bypass breaker 130 is closed and second bypass breaker 132 is open. Operating state S2 may be considered as a bypass state for STS 100 when first power source 104 is powering load 102 via first bypass breaker 130.

FIG. 7 depicts a flow chart of a method 700 of transitioning a static transfer switch from a normal operating state to a bypassed operating state in an exemplary embodiment. Method 700 will be discussed with respect to STS 100 of FIGS. 1-6, although method 700 may apply to other configurations of static transfer switches, not shown.

When transitioning from operating state S1 to S2 (e.g., when transitioning STS 100 from a normal operating state to a bypassed operating state), method 700 comprises determining 702 whether the inactive source circuit breaker has opened, opening 704 the inactive source contactor, and releasing 706 the lock on the active source bypass breaker. For example, controller 118 determines that second circuit breaker 116 is opened (e.g., by an operator), controller 118 opens second contactor 122, and controller 118 releases a lock on first bypass breaker 130.

Method 700 further comprises closing 708 the active source bypass breaker, locking 710 the inactive source circuit breaker, and deactivating 712 the active source power stage. For example, controller 118 or an operator closes first bypass breaker 130, controller 118 locks second circuit breaker 116 open, and controller 118 deactivates first power stage 126.

Method 700 further comprises opening 714 the active source contactor and opening 716 the load switch. For example, controller 118 opens first contactor 120 and load switch 124. The result of method 700 is that STS 100 is now in a bypassed state with first power source 104 powering load 102 via first bypass breaker 130.

In some embodiments, controller 118 may transition STS 100 from operating state S1 to S2 automatically in response to a command from an operator. For example, an operator may utilize user interface 208 to direct controller 118 to sequence the various operations described when transitioning from operating state S1 to S2 in response to the operator selecting a bypass operation at STS 100 when first power source 104 is powering load 102 (e.g., the operator may utilize user interface 208 to select a bypass operation at STS 100).

Figure 8:
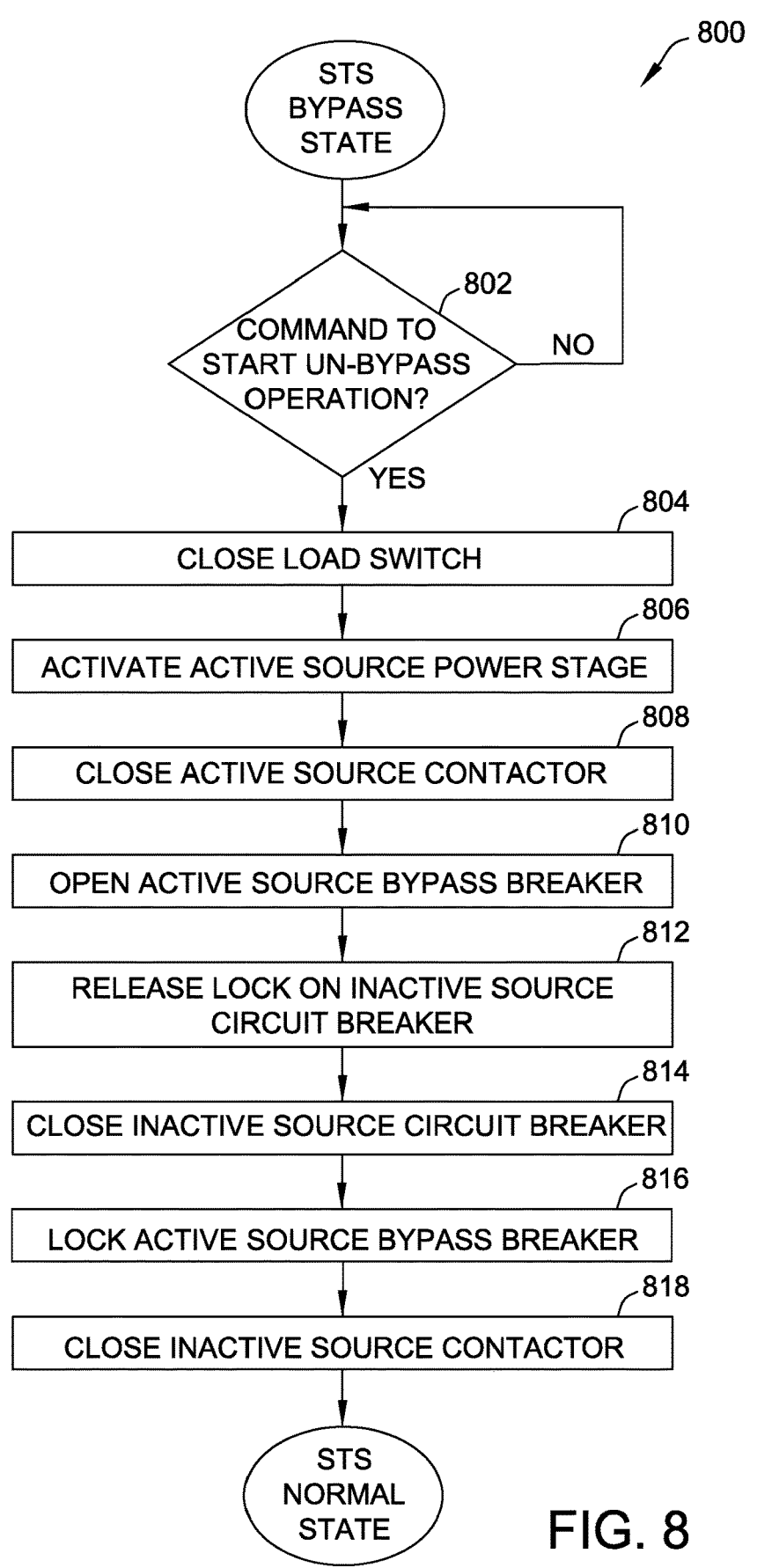
FIG. 8 is a flow chart of a method for transitioning a static transfer switch from a bypassed state to a normal state in an exemplary embodiment.

FIG. 8 depicts a flow chart of a method 800 of transitioning a static transfer switch from a bypassed operating state to a normal operating state in an exemplary embodiment. Method 800 will be discussed with respect to STS 100 of FIGS. 1-6, although method 800 may apply to other configurations of static transfer switches, not shown.

When transitioning from operating state S2 to S1 (e.g., when transitioning STS 100 from a bypassed operating state to a normal operating state), method 800 comprises determining 802 whether a command has been received to start an un-bypass operation at STS 100, closing 804 the load switch, and activating 806 the active source power stage. For example, controller 118 determines that an un-bypass command has been received (e.g., from an operator via user interface 208), controller 118 closes load switch 124 and activates first power stage 126.

Method 800 further comprises closing 808 the active source contactor, opening 810 the active source bypass breaker, and releasing 812 the lock on the inactive source circuit breaker. For example, controller 118 closes first contactor 120, controller 118 or the operator opens first bypass breaker 130, and controller 118 releases the lock on second circuit breaker 116.

Method 800 further comprises closing 814 the inactive source circuit breaker, locking 816 the active source bypass breaker, and closing 818 the inactive source contactor. For example, controller 118 or the operator closes second circuit breaker 116, controller 118 locks first bypass breaker 130 open, and controller 118 closes second contactor 122. The result of method 800 is that STS 100 is now in a normal or un-bypassed state with first power source 104 powering load 102 via first contactor 120, first power stage 126, and load switch 124.

In some embodiments, controller 118 may transition STS 100 from operating state S2 to S1 automatically in response to a command from an operator. For example, an operator may utilize user interface 208 to direct controller 118 to sequence the various operations described when transitioning from S2 to S1 in response to the operator selecting an STS un-bypass operation when first power source 104 is powering load 102. In some embodiments, controller 118 may prevent STS 100 from transitioning from operating state S2 to S1 when certain conditions are detected by controller 118. For example, if controller 118 detects that the power quality of first power source 104 is not acceptable (e.g., the voltage or frequency at first power source 104 is outside of a pre-determined range), then controller 118 may not close first contactor 120 in order to prevent damage to first power stage 126 and/or load switch 124 (when load switch 124 comprises solid-state switching devices). Further, controller 118 may operate to prevent first bypass breaker 130 from being opened as long as the power quality of first power source 104 is unacceptable.

As discussed briefly above, FIG. 5 depicts a simplified circuit diagram of STS 100 in the operating state S3 in an exemplary embodiment. In the operating state S3, second power source 106 is the power source for load 102 and first power source 104 is the backup or alternate power source for load 102. In operating state S3, first and second circuit breakers 114, 116, first and second contactors 120, 122, and load switch 124 are closed. First and second bypass breakers 130, 132 are open, first power stage 126 is inactive, and second power stage 128 is active.

Figure 6:
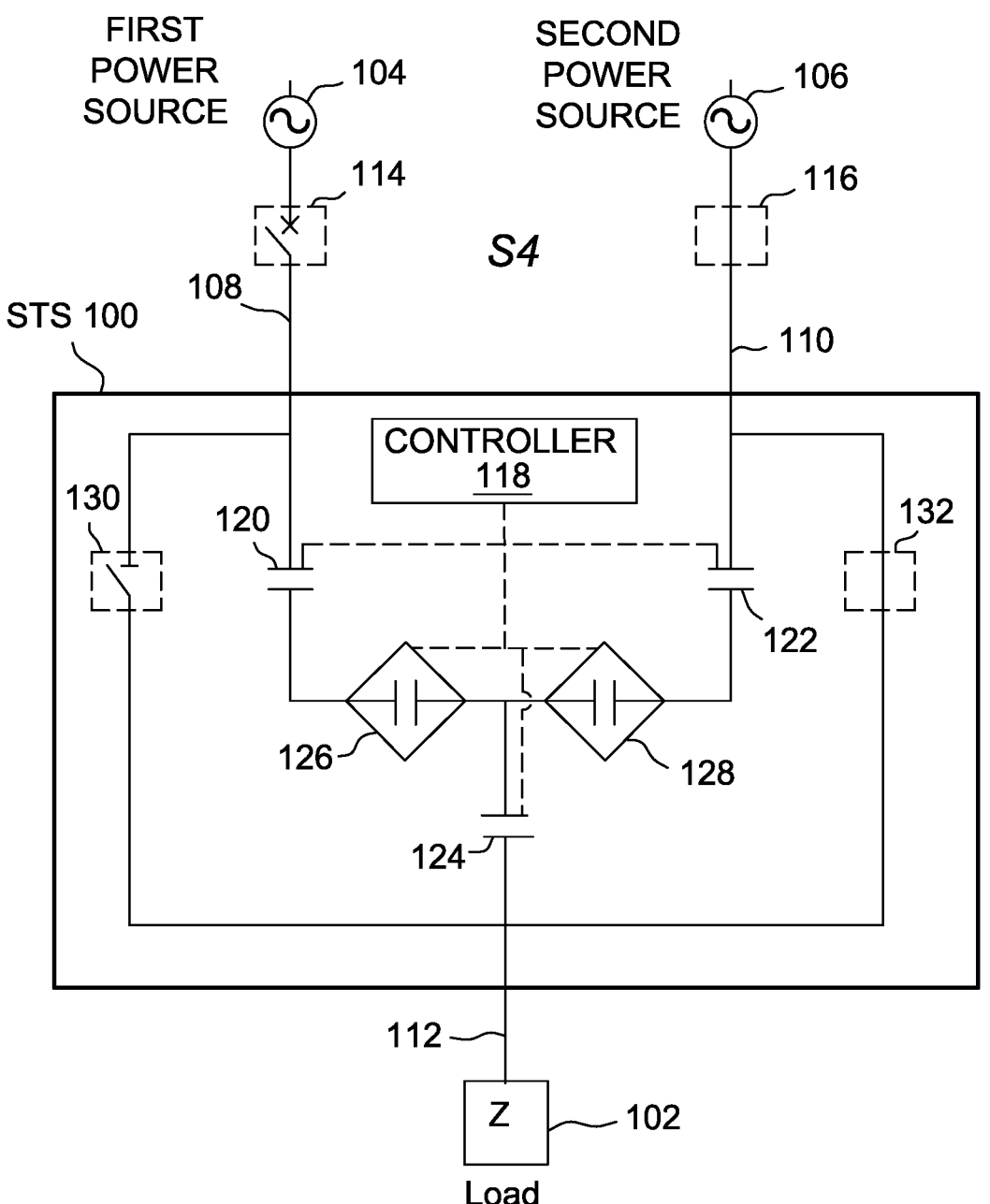
FIG. 6 depicts a simplified circuit diagram of the static transfer switch of FIG. 1 in an operating state S4 in an exemplary embodiment.

FIG. 6 depicts a simplified circuit diagram of STS 100 in an operating state S4 in an exemplary embodiment. In operating state S4, STS 100 is bypassed while second power source 106 continues to power load 102. In operating state S4, first circuit breaker 114 is open, second circuit breaker 116 is closed, first and second contactors 120, 122 are open, load switch 124 is open, first and second power stages 126, 128 are inactive, first bypass breaker 130 is open, and second bypass breaker 132 is closed.

When transitioning from operating state S3 to S4 (e.g., when transitioning STS 100 from a normal state to a bypass state), method 700 comprises determining 702 whether the inactive source circuit breaker has opened, opening 704 the inactive source contactor, and releasing 706 the lock on the active source bypass breaker. For example, controller 118 determines that first circuit breaker 114 is opened (e.g., by an operator), controller 118 opens first contactor 120, and controller 118 releases a lock on second bypass breaker 132.

Method 700 further comprises closing 708 the active source bypass breaker, locking 710 the inactive source circuit breaker, and deactivating 712 the active source power stage. For example, controller 118 or an operator closes second bypass breaker 132, controller 118 locks first circuit breaker 114 open, and controller 118 deactivates second power stage 128.

Method 700 further comprises opening 714 the active source contactor, and opening 716 the load switch. For example, controller 118 opens second contactor 122 and load switch 124. The result of method 700 is that STS 100 is now in a bypassed state with second power source 106 supplying electrical power to load 102 via second bypass breaker 132.

In some embodiments, controller 118 may transition STS 100 from operating state S3 to S4 automatically in response to a command from an operator. For example, an operator may utilize user interface 208 to direct controller 118 to sequence the various operations described when transitioning from operating state S3 to S4 in response to the operator selecting a bypass operation at STS 100 when second power source 106 is powering load 102 (e.g., the operator may utilize user interface 208 to select a bypass operation at STS 100).

When transitioning from operating state S4 to S3 (e.g., when transitioning STS 100 from a bypassed state to a normal state), method 800 comprises determining 802 whether a command has been received to start an un-bypass operation at STS 100, closing 804 the load switch, and activating 806 the active source power stage. For example, controller 118 determines that an un-bypass command has been received (e.g., from an operator via user interface 208), and controller 118 closes load switch 124 and activates second power stage 128.

Method 800 further comprises closing 808 the active source contactor, opening 810 the active source bypass breaker, and releasing 812 the lock on the inactive source circuit breaker. For example, controller 118 closes second contactor 122, controller 118 or the operator opens second bypass breaker 132, and controller 118 releases the lock on first circuit breaker 114.

Method 800 further comprises closing 814 the inactive source circuit breaker, locking 816 the active source bypass breaker, and closing 818 the inactive source contactor. For example, controller 118 or the operator closes first circuit breaker 114, controller 118 locks second bypass breaker 132 open, and controller 118 closes first contactor 120. The result of method 800 is that STS 100 is now in a normal or un-bypassed state with second power source 106 powering load 102 via second contactor 122, second power stage 128, and load switch 124.

In some embodiments, controller 118 may transition STS 100 from operating state S4 to S3 automatically in response to a command from an operator. For example, an operator may utilize user interface 208 to direct controller 118 to sequence the various operations described when transitioning from S3 to S2 in response to the operator selecting an STS un-bypass operation when second power source 106 is powering load 102. In some embodiments, controller 118 may prevent STS 100 from transitioning from operating state S4 to S3 when certain conditions are detected by controller 118. For example, if controller 118 detects that the power quality of second power source 106 is not acceptable (e.g., the voltage and/or frequency at second power source 106 is outside of a pre-determined range), then controller 118 may not close second contactor 122 in order to prevent damage to second power stage 128 and/or load switch 124 (when load switch 124 comprises solid-state switching devices). Further, controller 118 may operate to prevent second bypass breaker 132 from being opened as long as the power quality of second power source 106 is unacceptable.

An example technical effect of the apparatus and method described herein includes one or more of: (a) minimizing disruptions to a load buy preventing inadvertent operator error during bypass and un-bypass operations at an STS; (b) eliminate complicated electrical/trapped key interlocking schemes that add additional complexity to an STS; and (c) reduce the amount of front panel on an STS that is dedicated to operator actuated breakers and switches used to operate the STS.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A static transfer switch comprising:

first and second inputs, the first input configured to selectively couple with a first power source via a first circuit breaker, and the second input configured to selectively couple with a second power source via a second circuit breaker;

an output configured to couple with a load;

first and second bypass breakers, the first bypass breaker configured to selectively couple only the first input directly with the output, and the second bypass breaker configured to selectively couple only the second input directly with the output, wherein a first bypass connection comprising the first input, the first bypass breaker, and the output, does not include any additional elements configured to interrupt an electrical current flowing therethrough, and wherein a second bypass connection comprising the second input, the second bypass breaker, and the output, does not include any additional elements configured to interrupt an electrical current flowing therethrough;

first and second power stages each comprising at least one solid-state switch configured to:

conduct electrical power when a respective power stage is in an active state; and block the electrical power when the respective power stage is in an inactive state;

first and second contactors, the first contactor configured to selectively couple the first input with the first power stage, and the second contactor configured to selectively couple the second input with the second power stage;

a load switch configured to selectively couple the first and second power stages with the output, wherein the first and second power stages are configured to selectively couple the first and second contactors with the load switch, respectively, when in the active state; and a controller configured to modify an operating state of the first and second contactors and the active/inactive state of the first and second power stages.

2. The static transfer switch of claim 1, wherein:

the first and second circuit breakers are closed, the first and second bypass breakers are open, the first power stage is active, the second power stage is inactive, the first and second contactors are closed, and the load switch is closed, and the controller is further configured to determine whether the second circuit breaker has opened; and in response to determining that the second circuit breaker has opened, the controller is further configured to:

open the second contactor; and release a lock on the first bypass breaker.

3. The static transfer switch of claim 2, wherein the controller is further configured to:

cause the first bypass breaker to close; and lock the second circuit breaker in an open position.

4. The static transfer switch of claim 3, wherein the controller is further configured to:

deactivate the first power stage;

open the first contactor; and cause the load switch to open.

5. The static transfer switch of claim 1, wherein:

the first circuit breaker is closed, the second circuit breaker is open, the first bypass breaker is closed, the second bypass breaker is open, the first and second power stages are inactive, the first and second contactors are open, and the load switch is open, and the controller is further configured to:

receive a command to perform an un-bypass operation for the static transfer switch; and cause the load switch to close in response to receiving the command to perform the un-bypass operation for the static transfer switch.

6. The static transfer switch of claim 5, wherein the controller is further configured to:

activate the first power stage; and close the first contactor.

7. The static transfer switch of claim 6, wherein the controller is further configured to:

cause the first bypass breaker to open; and release a lock on the second circuit breaker.

8. The static transfer switch of claim 7, wherein the controller is further configured to:

cause the second circuit breaker to close;

lock the first bypass breaker open; and close the second contactor.

9. The static transfer switch of claim 5, wherein the controller is further configured to:

determine whether a power quality of the first power source is outside of a pre-defined range; and block the un-bypass operation from being performed in response to determining that the power quality of the first power source is outside of the pre-defined range.

10. The static transfer switch of claim 1, wherein:

the first and second circuit breakers are closed, the first and second bypass breakers are open, the first power stage is inactive, the second power stage is active, the first and second contactors are closed, and the load switch is closed, and the controller is further configured to determine whether the first circuit breaker has opened; and in response to determining that the first circuit breaker has opened, the controller is further configured to:

open the first contactor; and release a lock on the second bypass breaker.

11. The static transfer switch of claim 10, wherein the controller is further configured to:

cause the second bypass breaker to close; and lock the first circuit breaker in an open position.

12. The static transfer switch of claim 11, wherein the controller is further configured to:

deactivate the second power stage;

open the second contactor; and cause the load switch to open.

13. The static transfer switch of claim 10, wherein:

the first circuit breaker is open, the second circuit breaker is closed, the first bypass breaker is open, the second bypass breaker is closed, the first and second power stages are inactive, the first and second contactors are open, and the load switch is open, and the controller is further configured to:

receive a command to perform an un-bypass operation for the static transfer switch; and cause the load switch to close in response to receiving the command to perform the un-bypass operation for the static transfer switch.

14. The static transfer switch of claim 13, wherein the controller is further configured to:

activate the second power stage; and close the second contactor.

15. The static transfer switch of claim 14, wherein the controller is further configured to:

cause the second bypass breaker to open; and release a lock on the first circuit breaker.

16. The static transfer switch of claim 15, wherein the controller is further configured to:

cause the first circuit breaker to close;

lock the second bypass breaker open; and close the first contactor.

17. The static transfer switch of claim 13, wherein the controller is further configured to:

determine whether a power quality of the second power source is outside of a pre-defined range; and block the un-bypass operation from being performed in response to determining that the power quality of the second power source is outside of the pre-defined range.

18. A static transfer switch comprising:

first and second inputs, the first input configured to selectively couple with a first power source via a first circuit breaker, and the second input configured to selectively couple with a second power source via a second circuit breaker;

an output configured to couple with a load;

first and second bypass breakers, the first bypass breaker configured to selectively couple the first input with the output, and the second bypass breaker configured to selectively couple the second input with the output;

first and second power stages configured to conduct electrical power when active;

first and second contactors, the first contactor configured to selectively couple the first input with the first power stage, and the second contactor configured to selectively couple the second input with the second power stage;

a load switch configured to selectively couple the first and second power stages with the output; and a controller configured, in response to the first and second circuit breakers being closed, the first and second bypass breakers being open, the first power stage being active, the second power stage being inactive, the first and second contactors being closed, and the load switch being closed, to:

13 determine whether the second circuit breaker has
  opened; and
in response to determining that the second circuit
  breaker has opened, to:
  open the second contactor;
  release a lock on the first bypass breaker;
  close the first bypass breaker;
  lock the second circuit breaker in an open position;
  deactivate the first power stage;
  open the first contactor; and
  open the load switch.

19. The static transfer switch of claim 18, wherein:
the controller is further configured, in response to the first
  circuit breaker being closed, the second circuit breaker
  being open, the first bypass breaker being closed, the
  second bypass breaker being open, the first and second
  power stages being inactive, the first and second con-
  tactors being open, and the load switch being open, to:
  receive a command to perform an un-bypass operation
    for the static transfer switch; and

in response to receiving the command to perform the
    un-bypass operation, to:
  close the load switch;
  activate the first power stage;
  close the first contactor;
  open the first bypass breaker;
  release a lock on the second circuit breaker;
  close the second circuit breaker;
  lock the first bypass breaker open; and
  close the second contactor.

20. The static transfer switch of claim 19, wherein the
controller is further configured to:
  determine whether a power quality of the first power
    source is outside of a pre-defined range; and
  block the un-bypass operation from being performed in
    response to determining that the power quality of the
    first power source is outside of the pre-defined range.

\* \* \* \* \*